United States Patent
Kozel et al.

(10) Patent No.: US 12,536,984 B2
(45) Date of Patent: Jan. 27, 2026

(54) CAPACITIVE MUSICAL INSTRUMENT

(71) Applicant: Hard Rock Cafe International (USA), Inc., Davie, FL (US)

(72) Inventors: Jared Kozel, Atlanta, GA (US); Martin Wysor, Atlanta, GA (US); Ransom Haywood, Atlanta, GA (US); Pick Bickmore, Los Angeles, CA (US)

(73) Assignee: Hard Rock International (USA), Inc., Davie, FL (US)

( * ) Notice: Subject to any disclaimer, the term of this patent is extended or adjusted under 35 U.S.C. 154(b) by 837 days.

(21) Appl. No.: 16/891,942

(22) Filed: Jun. 3, 2020

(65) Prior Publication Data

US 2020/0380941 A1     Dec. 3, 2020

Related U.S. Application Data

(60) Provisional application No. 62/856,474, filed on Jun. 3, 2019.

(51) Int. Cl.
*G10H 1/34* (2006.01)
*G06F 3/044* (2006.01)

(52) U.S. Cl.
CPC .............. *G10H 1/342* (2013.01); *G06F 3/044* (2013.01); *G10H 2230/135* (2013.01)

(58) Field of Classification Search
None
See application file for complete search history.

(56) References Cited

U.S. PATENT DOCUMENTS

| | | | |
|---|---|---|---|
| 6,325,693 B1 | 12/2001 | Rudell et al. | |
| 6,383,536 B1 | 5/2002 | Palmer et al. | |
| 10,152,116 B2 | 12/2018 | Wang et al. | |
| 2002/0126851 A1* | 9/2002 | Lo | A47G 19/2227 215/400 |
| 2014/0168100 A1* | 6/2014 | Argiro | G06F 3/0346 345/173 |

OTHER PUBLICATIONS

Alison Kotin, "Making Music with Jello: A Digital Design Receipe", https://www.continuuminnovation.com/en/how-we-think/article/making-music-with-jello, May 7, 2015, pp. 1-15.

(Continued)

*Primary Examiner* — Stephen T. Reed
(74) *Attorney, Agent, or Firm* — MUNCY, GEISSLER, OLDS & LOWE, P.C.

(57) ABSTRACT

A capacitive musical instrument includes an instrument body having a space, the space including at least one plate to separate the space into at least two areas for holding ingredients of a food object, a plurality of inputs that each receive a capacitive signal from a corresponding one of the ingredients of the food object when the ingredients are touched by a user, a touch capacitive shield connected to the plurality of inputs, a memory that stores audio signal data that corresponds to each of the plurality of inputs, a controller that receives the capacitive signals from the plurality of inputs, converts the capacitive signals into audio signals based on the audio signal data stored in the memory, and outputs the audio signals to an output that generates sound based on the audio signals.

11 Claims, 2 Drawing Sheets

(56) References Cited

OTHER PUBLICATIONS

Dentaku, "Ototo: Make Music from Anything by Dentaku—Kickstarter", https://www.kickstarter.com/projects/905018498/ototo-make-music-from-anything, pp. 1-21, 2014.

Yan Wang et al., "The Singing Carrot: Designing Playful Experiences with Food Sounds", https://doi.org/10.1145/3270316.3271512, Publication: CHI PLAY '18 Extended Abstracts: Proceedings of the 2018 Annual Symposium on Computer-Human Interaction in Play Companion Extended Abstracts, pp. 669-676, Oct. 2018.

* cited by examiner

CAPACITIVE MUSICAL INSTRUMENT

CROSS REFERENCE TO RELATED APPLICATIONS

This application claims priority of U.S. Provisional Application No. 62/856,474 filed on Jun. 3, 2019 under 35 U.S.C. § 119(e), the entire contents of which are hereby incorporated by reference.

BACKGROUND

Technical Field

The present disclosure relates to a capacitive musical instrument. In particular, the present disclosure relates to a capacitive musical instrument that is provided with a food object and generates various sounds when a user touches components/ingredients of the food object.

Description of Related Art

Various instruments that utilize capacitance to generate sound are known. For example, U.S. Pat. No. 6,383,538 discloses an interactive foodstuff holding device that produces actions based on upon real-time interaction with physical characteristics of a secured foodstuff item.

However, such instruments are limited in interaction with the user.

SUMMARY

To address the above-discussed shortage, it is an object of the present application to provide a capacitive musical instrument that includes an instrument body having a space, the space including at least one plate to separate the space into at least two areas for holding ingredients of a food object, a plurality of inputs that each receive a capacitive signal from a corresponding one of the ingredients of the food object when the ingredients are touched by a user, a touch capacitive shield connected to the plurality of inputs, a memory that stores audio signal data that corresponds to each of the plurality of inputs, a controller that receives the capacitive signals from the plurality of inputs, converts the capacitive signals into audio signals based on the audio signal data stored in the memory, and outputs the audio signals to an output that generates sound based on the audio signals.

According to the present application, the instrument body has a shape of guitar body. The capacitive musical instrument further comprises a guitar neck attached to the instrument body, the guitar neck having guitar strings, and the controller is configured to modify the audio signals based on a user's operation of the guitar strings on the guitar neck.

The output is connected to the controller wiredly or wirelessly.

The capacitive musical instrument may further comprise a signal transmitter that wirelessly transmits the audio file to the output for generating the sound.

The capacitive musical instrument may also comprise a plurality of signal wires having first ends respectively connected to the plurality of inputs and second ends, a plurality of signal terminals respectively attached to the second ends of the plurality of signal wires and the ingredients of the food object. The plurality of signal terminals receives the capacitive signals from the ingredients of the food object and transmits to the plurality of inputs via the plurality of signal wires.

Another aspect of the present application is to provide a guitar-shaped capacitive musical instrument that includes a guitar body, a guitar neck connected to the guitar body having position markers, a guitar head including tuning keys, and guitar strings connecting the tuning keys and the guitar body. The guitar body includes a space divided into a plurality of areas by plates for holding ingredients of a food object, inputs for receiving signals, signal wires having signal contacts configured to be attached to the ingredients held in the space and transmits capacitive signals therethrough, a sound system including a touch capacitive shield connected to the inputs, a controller that generates an audio signal and a memory that stores audio files corresponding to the inputs; and an output that generates the audio signal received from the controller. The controller is configured so that when a user touches one of the ingredients of the food object and operates the guitar strings, the controller retrieves the audio file corresponding to the input that receives the capacitive signal from a touched ingredient from the memory, modifies the audio file based on the operation of the guitar strings, and converts the modified audio file into the audio signal to the output.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

It is understood that the following disclosure provides many different embodiments, or examples, for implementing different features of the disclosure. Specific examples of components and arrangements are described below to simplify the present disclosure. These are, of course, merely examples and are not intended to be limiting.

Figure 1A:
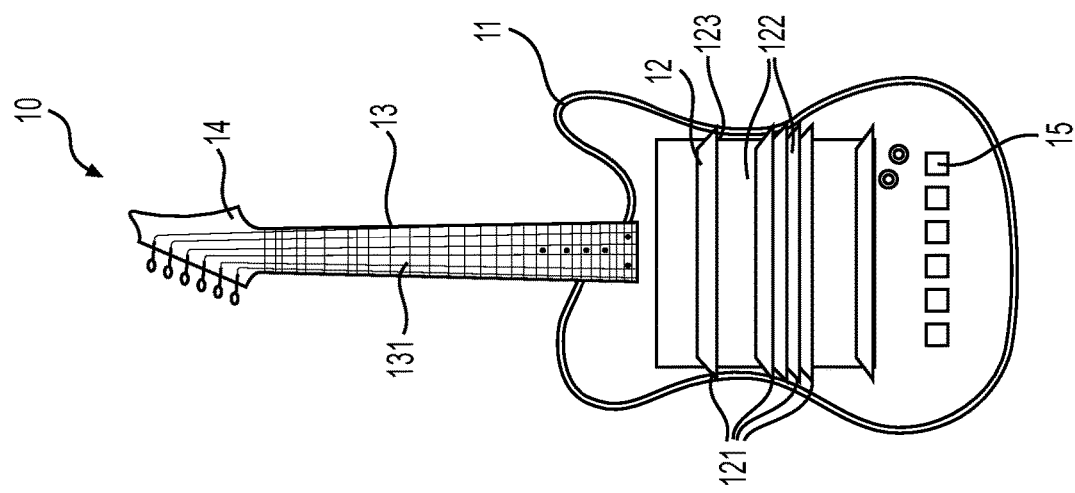
FIGS. 1A-1C are front views of a capacitive musical instrument according to an embodiment of the present application.
Figure 1B:
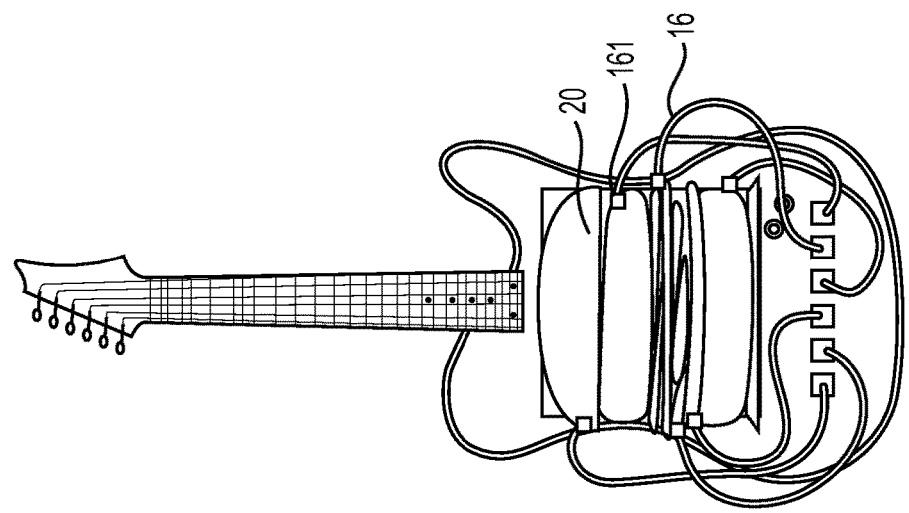
Figure 1C:
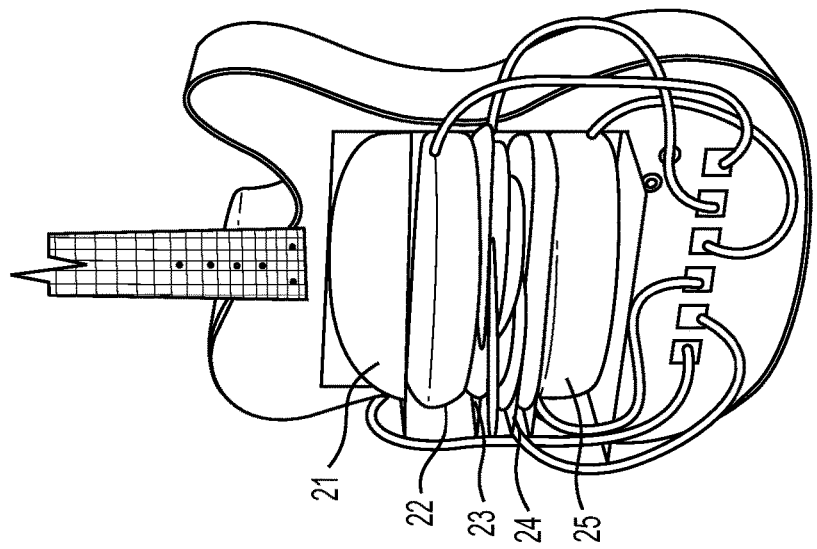

FIGS. 1A-1C are front views of a capacitive musical instrument according to an embodiment of the present application. As shown in FIG. 1A, the capacitive musical instrument may have a shape of an actual musical instrument, such as an electric guitar inspired instrument 10, which may have a guitar body 11, a space 12, a neck 13, a head 14 and a predetermined number of inputs 15. The space 12 may include a plurality of plates 121 that separate the space 12 into multiple areas 122. The multiple areas may be equally spaced or have different sizes. The plurality of plates 121 may be fixed or removable. Also, slots 123 for receiving the plates 121 may be provided inside the space 12 so that the position of the plates 121 may be changed to adjust the size of each area. As shown in FIG. 1B, the instrument 10 integrates the food object 20, such as a hamburger into the space 12. As shown in FIG. 1C, the food object 20 may include various components/ingredients, such as an upper bun 21, a meat patty 22, lettuce 23, tomato 24, a lower bun 25, etc. These components/ingredients are provided in the respective ones of the plates 121 in the space 12.

The neck 13 may be provided with one or more guitar strings 131 as shown in FIG. 1A. The neck may also be provided with a head having tuning keys and a sensor to detect the vibration of the guitar stings 131. The neck may also be provided with position markers for specific codes.

Signal cables 16 connect the inputs 15 to each of the components/ingredients. The connection between the inputs 15 and the signal cables 16 may be accomplished by a known method, such as direct soldering, via cable terminals or the like. The connection between the signal cables 16 and the components/ingredients may also be accomplished by a known method, such as by using needle-like signal probes, crocodile clips or the like. The instrument 10 further includes electronics inside the guitar body 11 to process the functions of the instrument 10 and facilitate the play of music as the user touches and interacts with each of the hamburger ingredients of the food object 20.

Figure 2:
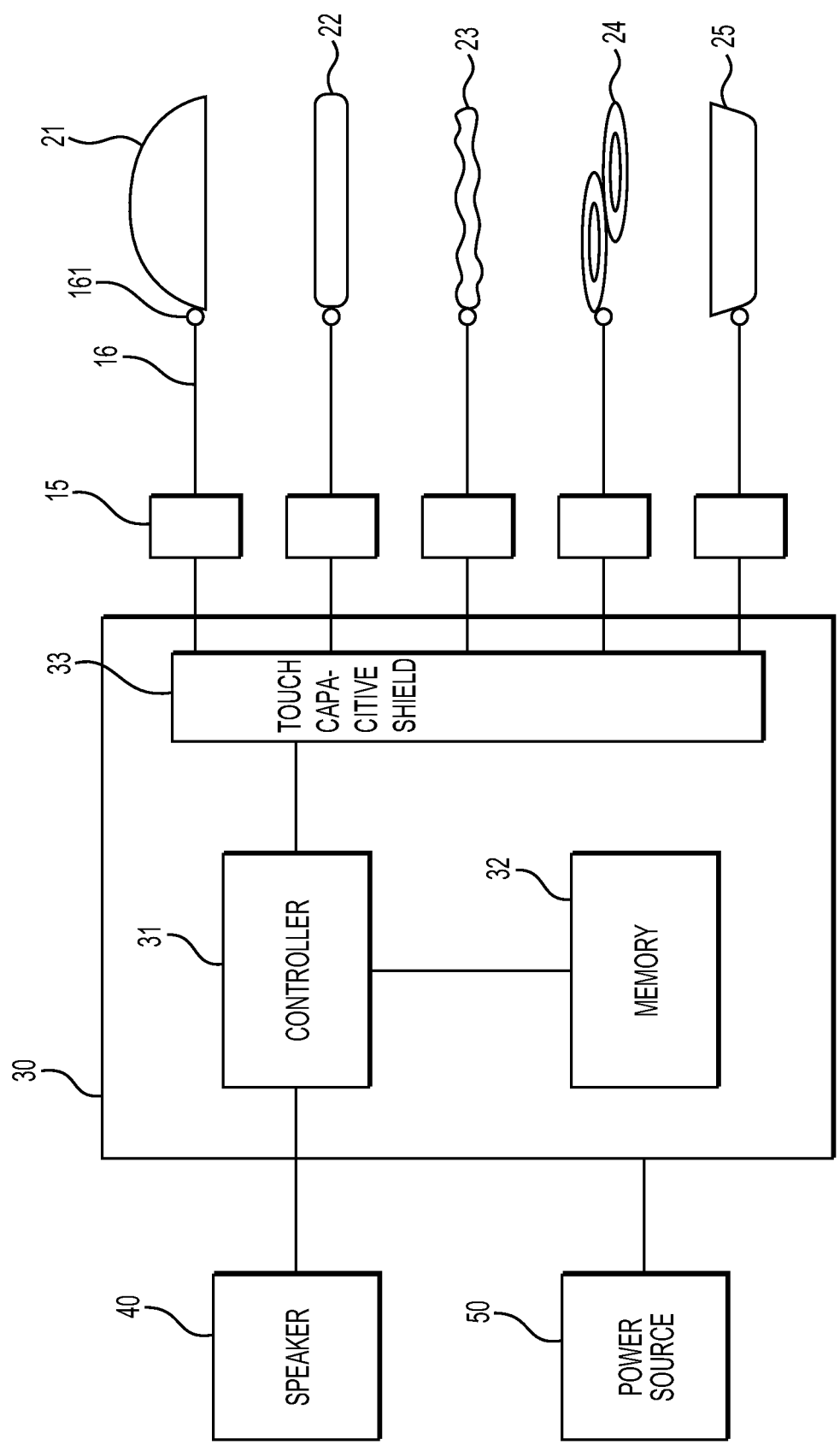
FIG. 2 is a block diagram of a capacitive musical instrument according to an embodiment of the present application.

As shown in FIG. 2, the electronics in the instrument 10 may be provided on a sound system 30. The sound system 30 may be a circuit board unit, such as Arduino Uno. The sound system 30 includes a controller 31, a memory 32 and a touch capacitive shield 33.

The controller 31 may be a generic computer processor or a programmable controller. The memory 32 may be any storage medium, such as a read-only memory (ROM), a Compact Disc ROM (CD-ROM), a Digital Versatile Disc ROM (DVD-ROM), a hard disc drive (HDD), a solid state drive (SSD), an external medium, such as micro SD card that can be provided via a slot, and the like, that is capable of storing necessary programs to be executed by the controller 31 to read and trigger audio files from the memory 32. The programs and the audio files may be pre-stored in the memory 32 or downloaded from a network via a wired or wireless connection. The audio files may be in any known format, such as MP3 or MIDI.

The touch capacitive shield 33 is connected to the predetermined number (e.g., six) of inputs 15 each connected to an ingredient of the food object 20 with a signal cable 16. Instead of using the signal cables 16, the inputs 15 can be connected to the ingredients of the food object 20 wirelessly by providing a transmitter connected to the ingredients 20 and a receiver in the instrument 10.

The audio signal is sent to a speaker 40 to output sound. The speaker 40 may be provided on the guitar body 11 or may be connected to the guitar body via a connector, such as the 3.5 mm stereo jack. This connection may be provided in the sound system 30 at line level. Alternatively, the sound system 30 may include a signal transmitter that wirelessly transmits the audio signal to an external speaker through a Bluetooth connection or the like. An amplifier may be provided in the sound system 30 or externally.

The sound system 30 is powered by a power source 50, such as a 9 v battery, which may be provided inside the instrument 10 or an external power source connected to the sound system 30.

Code uploaded to the memory 32 of the sound system 30 enables the controller 31 to talk to the other components. In other words, when an ingredient (e.g., bun 21) of the food object 20 is touched, small static electricity detected by the corresponding input 15 via the signal cable 16 causes a message from the corresponding input 15 connected to the touch capacitive shield 33 to be sent to the sound system 30. This tells the controller 31 to send sound signals and loop a specific audio sample to the speaker 40. For example, the sound signals may be a predetermined music code or a short melody. Then when that ingredient is no longer touched, the static electricity is no longer detected, causing another message from the input 15 on the touch capacitive shield 33 to be sent to the sound system 30, which tells the controller 31 to stop playing the audio sample.

Capacitive touch sensing works by attaching a sensor electrode (or anything electrically conductive that is already connected to the sensor electrodes) 161 provided at an end of the wire 16 to each ingredient of the food object 20 and detecting when a user has touched one of the ingredients 20. The touch capacitive shield 33 measures and monitors the capacitance detected by the sensor electrode 161 through the input 15. When touched, the touch capacitive shield 33 detects a change in the measured capacitance at the sensor electrode 161. Then, the touch capacitive shield 33 sends an ON signal to the controller 30, which can translate the capacitance change to a message like "button pressed" or "trigger audio" based on the sound data stored in the memory 32. Then the user releases the touch, and the capacitance measured by the sensor electrode 161 is changed. The touch capacitive shield 33 sends an OFF signal to the controller 30, resulting the sound from the speaker 40 to be stopped.

All the initial capacitive measurements may be made the moment the power source 50 powers on the sound system 30. A change in any of these measurements is sensed by the sensor electrodes 161, that is, when an event, like playing or stopping audio, is triggered. Thus, all the ingredients may be plugged in before the electronics are turned on.

As discussed above, the strings 131 may be provided on the neck 13 of the electric guitar inspired instrument 10. When the user touches one or more of the strings while touching the ingredients of the food object 20 to play music, together with a sensor, such as a pickup sensor or a vibration sensor, may detect the operation of the strings and send a signal to the controller 31. The controller 31 then change the sound of the audio files trigger by the controller 31 or mixes another sound stored in the memory with the sound of the audio file to be output.

Moreover, other parts found on an actual electric guitar may be provided on the electric guitar inspired instrument 10, such as control knobs and a tremolo arm, to change the sound and volume of the audio sound triggered by the controller 31.

The electric guitar inspired instrument 10 according to the present application is a musical instrument but can also be integrated to or utilized as a food plate for serving the food to the customer in a restaurant, for example.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined by the appended claims.

The invention claimed is:

1. A capacitive musical instrument, comprising:
an instrument body having a space, the space including at least one plate to separate the space into at least two areas for holding ingredients of a food object, at least one of the ingredients of the food object being a conductive food item;
a plurality of inputs that each receive a capacitive signal from a corresponding one of the ingredients of the food object when the ingredients are touched by a user;
a touch capacitive shield connected to the plurality of inputs;
a memory that stores audio signal data that corresponds to each of the plurality of inputs;
a power source;
an output;
a controller that receives the capacitive signals from the plurality of inputs, converts the capacitive signals into audio signals based on the audio signal data stored in the memory, and outputs the audio signals to the output;
a plurality of signal wires having first ends respectively connected to the plurality of inputs and second ends; and
a plurality of signal terminals respectively attached to the second ends of the plurality of signal wires and the ingredients of the food object, the plurality of signal terminals comprising needle probes or crocodile clips to attach to the ingredients of the food object,
wherein the plurality of signal terminals receives the capacitive signals from the ingredients of the food object and transmits to the plurality of inputs via the plurality of signal wires, and
wherein the output generates sound based on the audio signals.

2. The capacitive musical instrument according to claim 1, wherein the instrument body has a shape of guitar body,
wherein the capacitive musical instrument further comprises a guitar neck attached to the instrument body, the guitar neck having guitar strings, and
wherein the controller is configured to modify the audio signals based on a user's operation of the guitar strings on the guitar neck.

3. The capacitive musical instrument according to claim 1, wherein the output is connected to the controller wiredly.

4. The capacitive musical instrument according to claim 1, wherein the at least one plate comprises a plurality of plates.

5. The capacitive musical instrument according to claim 4, wherein the plurality of plates is equally spaced within the space.

6. The capacitive musical instrument according to claim 4, wherein the plurality of plates is removable.

7. The capacitive musical instrument according to claim 1, wherein the space includes at least one slot configured to receive the at least one plate.

8. The capacitive musical instrument according to claim 1, wherein the ingredients of the food object comprise an upper bun, a lower bun, a meat patty, lettuce and tomato.

9. The capacitive musical instrument according to claim 4, wherein the ingredients of the food object are each separately contained on a respective one of the plurality of plates.

10. The capacitive musical instrument according to claim 1, further comprising a sensor electrode provided at the second end of the plurality of signal wires,
wherein the controller is configured to measure and monitor capacitance detected by the sensor electrode.

11. A guitar-shaped capacitive musical instrument, comprising:
a guitar body;
a guitar neck connected to the guitar body having position markers;
a guitar head including tuning keys; and
guitar strings connecting the tuning keys and the guitar body,
wherein the guitar body includes:
a space divided into a plurality of areas by plates for holding ingredients of a food object, at least one of the ingredients of the food object being a conductive food item;
inputs for receiving signals;
signal wires having signal contacts configured to be attached to the ingredients held in the space and transmits capacitive signals therethrough;
a sound system including a touch capacitive shield connected to the inputs, a controller that generates an audio signal and a memory that stores audio files corresponding to the inputs;
a power source connected to the sound system; and
an output that generates the audio signal received from the controller;
a plurality of signal terminals respectively attached to the signal wires and the ingredients of the food object, the plurality of signal terminals comprising needle probes or crocodile clips to attach to the ingredients of the food object,
wherein the signal terminals receive the capacitive signals from the ingredients of the food object and transmit to the inputs via the signal wires, and
wherein the controller is configured so that when a user touches one of the ingredients of the food object and operates the guitar strings, the controller retrieves the audio file corresponding to the input that receives the capacitive signal from a touched ingredient from the memory, modifies the audio file based on the operation of the guitar strings, and converts the modified audio file into the audio signal to the output.

* * * * *